(12) United States Patent
Takahashi et al.

(10) Patent No.: US 12,455,412 B2
(45) Date of Patent: Oct. 28, 2025

(54) MULTICORE FIBER

(71) Applicant: FURUKAWA ELECTRIC CO., LTD., Tokyo (JP)

(72) Inventors: Masanori Takahashi, Tokyo (JP); Koichi Maeda, Tokyo (JP); Ryuichi Sugizaki, Tokyo (JP); Yoshihiro Arashitani, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 279 days.

(21) Appl. No.: 18/178,620

(22) Filed: Mar. 6, 2023

(65) Prior Publication Data

US 2023/0204853 A1 Jun. 29, 2023

Related U.S. Application Data

(63) Continuation of application No. PCT/JP2021/033899, filed on Sep. 15, 2021.

(30) Foreign Application Priority Data

Sep. 17, 2020 (JP) .................................. 2020-156467

(51) Int. Cl.
*G02B 6/02* (2006.01)
(52) U.S. Cl.
CPC .............................. *G02B 6/02042* (2013.01)
(58) Field of Classification Search
None
See application file for complete search history.

(56) References Cited

U.S. PATENT DOCUMENTS

| | | | |
|---|---|---|---|
| 4,681,399 A * | 7/1987 | Hicks, Jr. | G02B 6/105 385/129 |
| 7,050,686 B2 | 5/2006 | Farroni et al. | |
| 7,634,164 B2 | 12/2009 | Farroni et al. | |
| 8,687,936 B2 | 4/2014 | Nakanishi et al. | |
| 10,031,283 B2 | 7/2018 | Nakanishi et al. | |
| 2011/0222828 A1 | 9/2011 | Sasaoka et al. | |
| 2013/0064513 A1* | 3/2013 | Nagashima | G02B 6/02366 385/123 |

(Continued)

FOREIGN PATENT DOCUMENTS

| | | |
|---|---|---|
| JP | 2006-058494 A | 3/2006 |
| JP | 2011-209702 A | 10/2011 |
| JP | 2013-122502 A | 6/2013 |

(Continued)

OTHER PUBLICATIONS

International Search Report issued Nov. 9, 2021 in PCT/JP2021/033899 filed Sep. 15, 2021, 2 pages.

(Continued)

*Primary Examiner* — Chris H Chu
(74) *Attorney, Agent, or Firm* — Oblon, McClelland, Maier & Neustadt, L.L.P.

(57) ABSTRACT

A multicore fiber includes: a plurality of first glass regions each including: a core portion; and a first cladding portion having a lower refractive index than a maximum refractive index of the core portion; and a cladding region formed on outer peripheries of the plurality of first glass regions, wherein compressive stress is applied to the plurality of first glass regions.

7 Claims, 8 Drawing Sheets

(56) References Cited

U.S. PATENT DOCUMENTS

2018/0299613 A1* 10/2018 Nakanishi .......... G02B 6/02014
2021/0193898 A1*  6/2021 Nishi ................. H01B 13/0006

FOREIGN PATENT DOCUMENTS

| JP | 2017-036197 A | 2/2017 |
| JP | 2017-161705 A | 9/2017 |
| JP | 2017-171555 A | 9/2017 |

OTHER PUBLICATIONS

Japanese Office Action dated Jul. 15, 2025 in Japanese Patent Application No. 2022-550579, w/English translation, citing documents 15 and 16 therein, 5 pages.

* cited by examiner

MULTICORE FIBER

This application is a continuation of International Application No. PCT/JP2021/033899, filed on Sep. 15, 2021 which claims the benefit of priority of the prior Japanese Patent Application No. 2020-156467, filed on Sep. 17, 2020, the entire contents of which are incorporated herein by reference.

BACKGROUND

The present disclosure relates to a multicore fiber.

In the related art, a multicore fiber as an optical fiber that includes a plurality of core portions is known. In general, when the multicore fiber is manufactured, a multicore fiber preform that includes a cylindrical cladding rod, which serves as a cladding portion, and a plurality of core rods, each including a core portion and a cladding portion that is formed on an outer periphery of the core portion, is used. The multicore fiber is manufactured by integrating and drawing the multicore fiber preform (or by drawing the multicore fiber while integrating the multicore fiber).

As a method of manufacturing the multicore fiber preform as described above, for example, a perforation method is known in which a plurality of holes are formed (perforated) in the cylindrical cladding rod by using a drill, and the plurality of the core rods are inserted in the respective holes (see Japanese Laid-open Patent Publication No. 2011-209702). In the perforation method as described above, the cladding rod in which the plurality of holes are formed by a perforation process and the plurality of core rods that are inserted in the respective holes are integrated by heat treatment. As a result, the multicore fiber preform is formed as a preform in which the cladding portion and the plurality of core portions are integrated.

SUMMARY

In the multicore fiber preform that is manufactured by the perforation method, when the cladding rod that has been subjected to the perforation process and the core rods in the plurality of holes are integrated by heat treatment, tensile stress is concentrated at the side of the cladding portion in the plurality of core portions due to an influence of thermal contraction or the like of the cladding portion. As a result, in a multicore fiber that is drawn from the multicore fiber preform, the tensile stress is applied from the cladding portion to each of the core portions, and a transmission loss of the multicore fiber increases due to the tensile stress, which is a problem.

There is a need for a multicore fiber in which an increase in the transmission loss is prevented.

According to one aspect of the present disclosure, there is provided a multicore fiber including: a plurality of first glass regions each including: a core portion; and a first cladding portion having a lower refractive index than a maximum refractive index of the core portion; and a cladding region formed on outer peripheries of the plurality of first glass regions, wherein compressive stress is applied to the plurality of first glass regions.

According to another aspect of the present disclosure, there is provided a multicore fiber including: a plurality of first glass regions each including: a first core portion; and a first cladding portion having a lower refractive index than a maximum refractive index of the first core portion; a second glass region including a second cladding portion surrounded by the plurality of first glass regions, the second cladding portion coming into contact with the first cladding portions of the plurality of first glass regions; and a cladding region formed on outer peripheries of the plurality of first glass regions and the second glass region, wherein in a stress distribution generated between the first core portions of the plurality of first glass regions that face each other across the second glass region, an average value of compressive stress in the first glass regions is smaller than an average value of compressive stress in the second glass region.

DETAILED DESCRIPTION

Embodiments will be described in detail below with reference to the drawings. The present disclosure is not limited by the embodiments below. Further, in description of the drawings, the same or corresponding components are appropriately denoted by the same reference symbols. It is necessary to note that the drawings are schematic, and dimensional relations of each of components, ratios among components, and the like may be different from actual ones. The drawings may include a portion that has different dimensional relations or ratios. Furthermore, in the present specification, a cutoff wavelength indicates a cable cutoff wavelength that is defined by ITU-T (International Telecommunication Union) G.650.1. Moreover, other terms that are not specifically defined in the present specification conform to the definitions and the measurement methods described in ITU-T G.650.1 and G.650.2.

First Embodiment

Configuration of Multicore Fiber Preform

Figure 1:
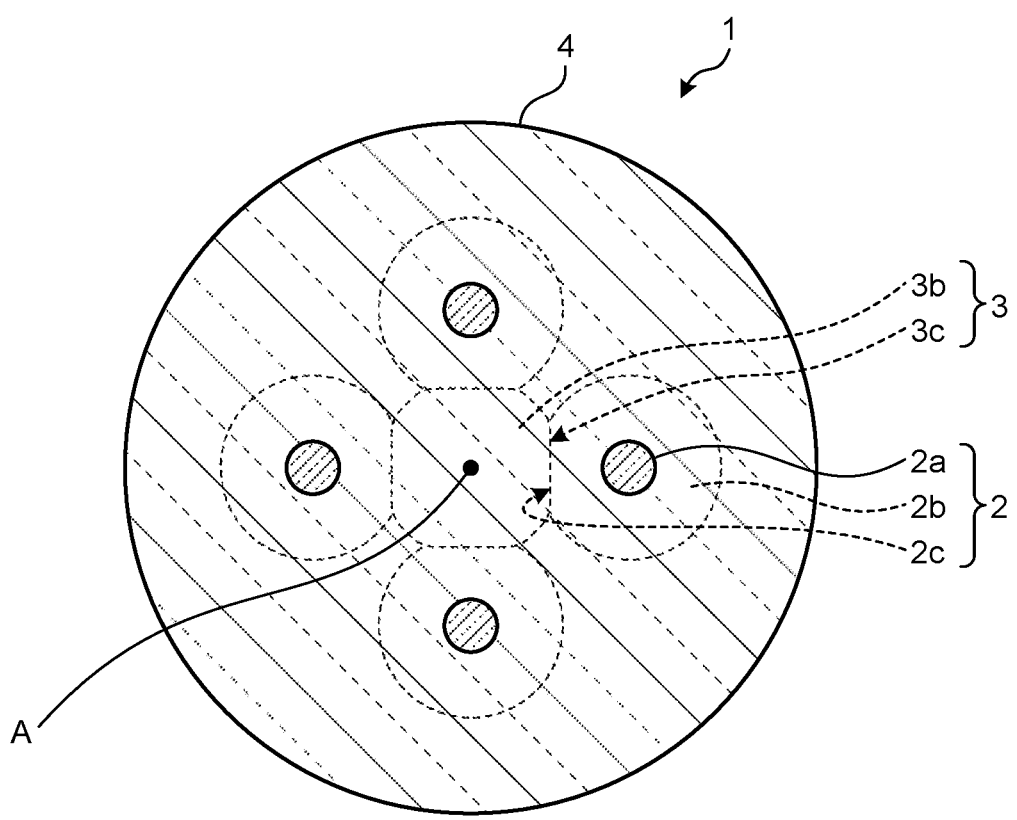
FIG. 1 is a transverse cross-sectional view illustrating a configuration example of a multicore fiber preform that is used to manufacture a multicore fiber according to a first embodiment.

First, a configuration of a multicore fiber preform that is used to manufacture a multicore fiber according to a first embodiment will be described below. FIG. 1 is a transverse cross-sectional view illustrating a configuration example of the multicore fiber preform that is used to manufacture the multicore fiber according to the first embodiment. As illustrated in FIG. 1, a multicore fiber preform 1 according to the first embodiment includes a plurality of (for example, four) first glass rods 2, a second glass rod 3, and a cladding 4. Meanwhile, in the multicore fiber preform 1 illustrated in FIG. 1, the plurality of first glass rods 2, the second glass rod 3, and the cladding 4 are integrated with one another by an integration process (to be described later).

Each of the first glass rods 2 includes, as illustrated in FIG. 1, a first core portion 2a that serves as a core portion, and a first cladding portion 2b. The first core portion 2a is configured with, for example, silica based glass that is doped with a dopant (germanium or the like) to increase a refractive index. The first cladding portion 2b is configured with glass that has a lower refractive index than a maximum refractive index of the first core portion 2a. Examples of the glass that constitutes the first cladding portion 2b as described above include pure quartz glass with no dopant for adjusting the refractive index. Further, as illustrated in FIG. 1, the first cladding portion 2b is formed on an outer periphery of the first core portion 2a. A contact surface 2c as a plane surface that comes into contact with the second glass rod 3 is formed in a part of an outer periphery of the first cladding portion 2b as described above.

The second glass rod 3 includes, as illustrated in FIG. 1, a second cladding portion 3b, and is surrounded by the plurality of first glass rods 2. Specifically, as illustrated in FIG. 1, the second cladding portion 3b comes into contact with each of the first cladding portions 2b of the plurality of first glass rods 2. A contact surface 3c as a plane surface that comes into contact with the first cladding portion 2b is formed in each of portions facing the plurality of first glass rods 2 on an outer periphery of the second cladding portion 3b. In other words, the contact surfaces 2c of the first glass rods 2 and the contact surfaces 3c of the second glass rod 3 are plane surfaces that come into contact with each other.

Furthermore, the second cladding portion 3b may be configured with the same silica based glass as the first cladding portion 2b as described above, but it is preferable to include low softening point glass that has a lower softening point than the first cladding portion 2b. For example, the low softening point glass is configured by adding a dopant, such as potassium (K), phosphorus (P), chlorine (Cl), fluorine (F), or germanium (Ge), for reducing a softening point to certain glass, such as pure quartz glass with no dopant for adjusting a refractive index, that has a lower refractive index than the maximum refractive index of the first core portion 2a. Meanwhile, if F and Ge are co-doped as dopants as described above, the amount of each dopant may be adjusted such that the doped glass has a refractive index with a certain value that is the same as or close to the refractive index (in other words, about 1.444 at a wavelength of 1550 nanometers (nm)) of the pure quartz glass.

The cladding 4 is formed on the outer peripheries of the plurality of first glass rods 2 and the second glass rod 3 as illustrated in FIG. 1. For example, the cladding 4 is configured with the same silica based glass as the first cladding portion 2b as described above. Meanwhile, the refractive indices of the first cladding portions 2b, the second cladding portion 3b, and the cladding 4 may be the same with each other or may be different from each other.

Furthermore, in the first embodiment, as illustrated in FIG. 1 for example, the plurality of first core portions 2a are arranged so as to face each other across a central axis A of the second cladding portion 3b of the second glass rod 3. In this case, a distance between a central axis of each of the first core portions 2a and the central axis A of the second cladding portion 3b may be set to the same value or a different value. Moreover, the central axis A of the second cladding portion 3b may match with a central axis of the cladding 4 or may be deviated from the central axis. In the present disclosure, the "central axis" indicates a central axis in a longitudinal direction of a subject component.

Method of Manufacturing Multicore Fiber

Figure 2:
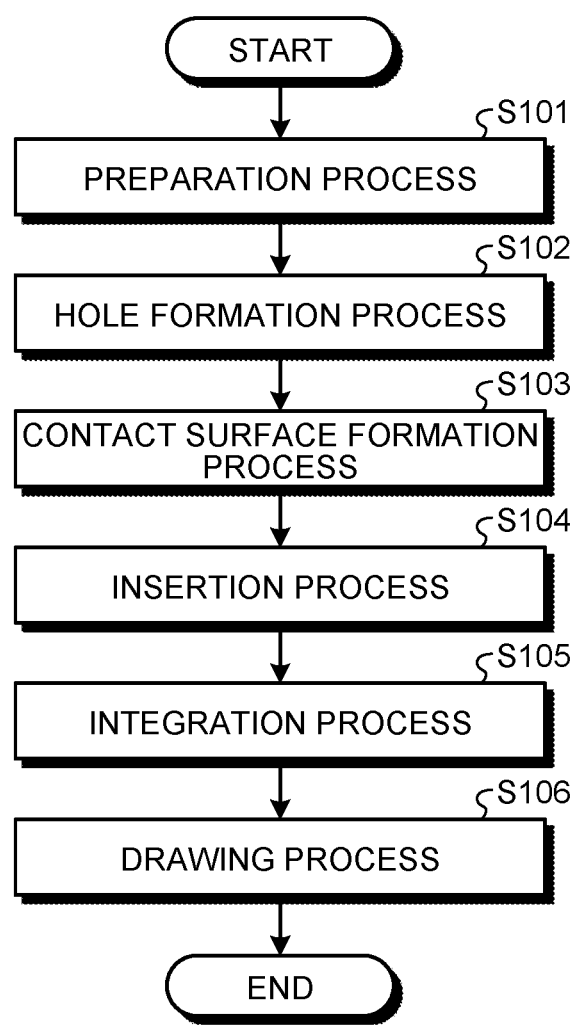
FIG. 2 is a flowchart illustrating an example of a method of manufacturing the multicore fiber according to the first embodiment.

A method of manufacturing the multicore fiber according to the first embodiment will be described below. FIG. 2 is a flowchart illustrating an example of the method of manufacturing the multicore fiber according to the first embodiment. In the first embodiment, by performing each of processes at Steps S101 to S106 illustrated in FIG. 2, the multicore fiber preform 1 is first manufactured, and thereafter, a target multicore fiber is manufactured from the multicore fiber preform 1.

Specifically, as illustrated in FIG. 2, a preparation process of preparing a member for manufacturing the multicore fiber preform 1 is firstly performed (Step S101). At Step S101, the plurality of (four in the first embodiment) cylindrical first glass rods 2 each including the first core portion 2a and the first cladding portion 2b as described above are prepared. Further, the cylindrical second glass rod 3 including the second cladding portion 3b and the cylindrical cladding 4 are prepared. Each of the first glass rods 2, the second glass rod 3, and the cladding 4 may be manufactured by a well-known method, such as the Vapor phase Axial deposition (VAD) method, the Outside Vapor Deposition (OVD) method, or the Modified Chemical Vapor Deposition (MCVD) method.

After the preparation process is performed at Step S101, the hole formation process of forming holes in the cylindrical cladding 4 for inserting the plurality of first glass rods 2 and the second glass rod 3 is performed (Step S102). At Step S102, the plurality of holes for inserting the plurality of first glass rods 2 and the hole for inserting the second glass rod 3 are formed in the cylindrical cladding 4.

Figure 3:
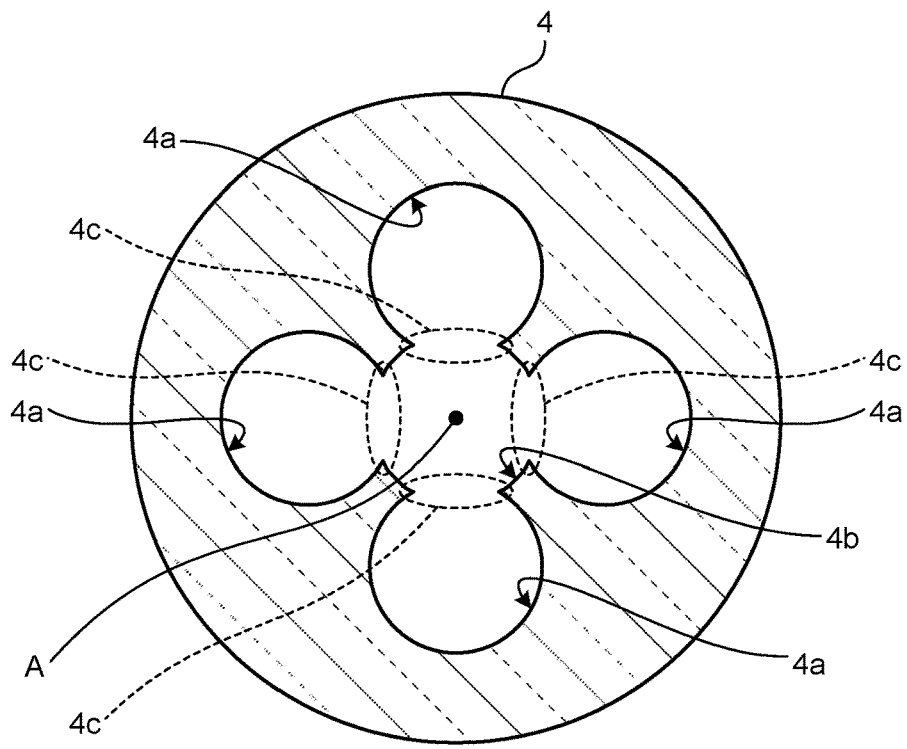
FIG. 3 is a transverse cross-sectional view illustrating an example of a cladding in which holes are formed by a hole formation process of the first embodiment.

FIG. 3 is a transverse cross-sectional view illustrating an example of the cladding in which the holes are formed by the hole formation process of the first embodiment. As illustrated in FIG. 3, a plurality of (four in the first embodiment) first holes 4a for inserting the plurality of first glass rods 2 and a second hole 4b for inserting the second glass rod 3 are formed inside the cladding 4 so as to extend along a longitudinal direction of the cylindrical cladding 4. In this case, the plurality of first holes 4a are formed at positions at which the plurality of first glass rods 2 are arranged in the cladding 4. The second hole 4b is formed at a position at which the second glass rod 3 is arranged in the cladding 4. Furthermore, as illustrated in FIG. 3, the plurality of first holes 4a and the second hole 4b are formed so as to communicate with one another via opening portions 4c.

The plurality of first holes 4a and the second hole 4b as described above may be formed simultaneously by using a non-open-cut method and by applying heat to the cylindrical cladding 4, for example. Further, it may be possible to prepare the cladding 4 in which the plurality of first holes 4a and the second hole 4b are formed in advance, by a powder molding method or the like.

After the hole formation process is performed at Step S102, a contact surface formation process of forming the contact surfaces on the outer peripheries of the plurality of first glass rods 2 and the second glass rod 3 is performed (Step S103). At Step S103, in each of the first glass rods 2, a part (a part that faces the second glass rod 3) of the outer periphery of the cylindrical first glass rod 2 is ground along a longitudinal direction of the first glass rod 2. Accordingly, the contact surface 2c (see FIG. 1) is formed in each of the first glass rods 2. Furthermore, parts (parts that face the plurality of first glass rods 2) of the outer periphery of the cylindrical second glass rod 3 are ground along a longitudinal direction of the second glass rod 3. Accordingly, the same number of the contact surfaces 3c (see FIG. 1) as the first glass rods 2 are formed in the second glass rod 3.

Meanwhile, in the present disclosure, it may be possible to prepare the first glass rods 2 and the second glass rod 3 in which the contact surfaces 2c and the contact surfaces 3c are formed in advance, by a power molding method or the like. Further, the contact surface formation process at Step S103 may be performed before the hole formation process at Step S102 as described above.

Subsequently, an insertion process of inserting the plurality of first glass rods 2 and the second glass rod 3 in the holes formed in the cladding 4 is performed (Step S104). At Step S104, each of the first glass rods 2 is inserted in each of the first holes 4a formed in the cladding 4, and the second glass rod 3 is inserted in the second hole 4b formed in the cladding 4.

Figure 4:
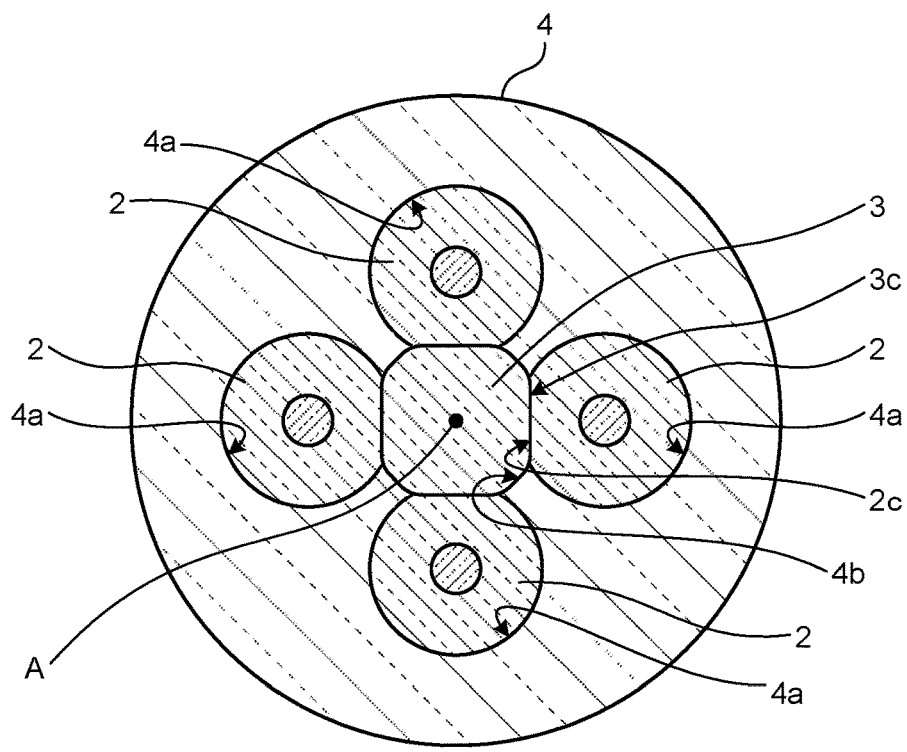
FIG. 4 is a transverse cross-sectional view illustrating an example of a state in which glass rods are inserted in the holes of the cladding by an insertion process of the first embodiment.

FIG. 4 is a transverse cross-sectional view illustrating a state in which the glass rods are inserted in the holes of the cladding by the insertion process of the first embodiment. As illustrated in FIG. 4, the plurality of (for example, four) first glass rods 2 are respectively inserted in the plurality of (for example, four) first holes 4a such that the contact surfaces 3c of the second glass rod 3 that is inserted in the second hole 4b of the cladding 4 and the contact surfaces 2c of the first glass rods 2 come into contact with each other. Meanwhile, the order of insertion of the first glass rods 2 and the second glass rod 3 is not specifically limited in the present disclosure.

After the insertion process is performed at Step S104, an integration process of integrating the plurality of first glass rods 2, the second glass rod 3, and the cladding 4 as described above with one another is performed (Step S105). At Step S105, an intermediate structure (see FIG. 4) that is obtained by inserting the first glass rods 2 and the second glass rod 3 in the respective holes of the cladding 4 through the insertion process as described above is heated in a heating furnace, for example. Through the heating process, gaps between the plurality of first glass rods 2, the second glass rod 3, and the cladding 4 in the intermediate structure are closed (collapsed), so that the first glass rod 2, the second glass rod 3, and the cladding 4 are integrated with one another as illustrated in FIG. 1.

Through the processes at Steps S101 to S105 as described above, the target multicore fiber preform 1 is manufactured. Meanwhile, in the present disclosure, it may be possible to omit the integration process at Step S105 as described above, and simultaneously perform integration of the intermediate structure and drawing of the multicore fiber preform 1 in a drawing process as described below.

Figure 5:
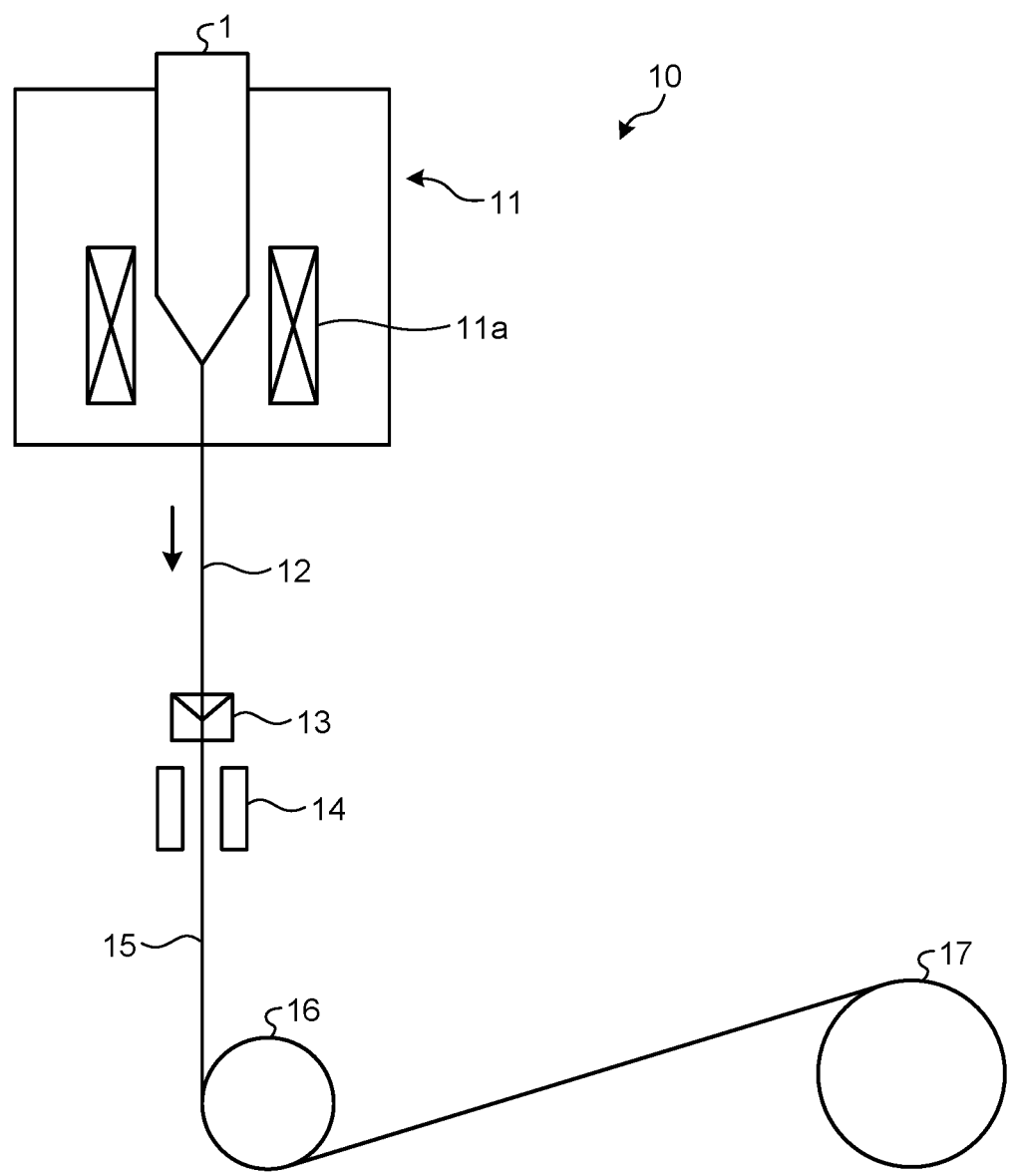
FIG. 5 is a schematic view for explaining a drawing process in the first embodiment.

Subsequently, the drawing process of drawing the obtained multicore fiber preform 1 and manufacturing a target multicore fiber is performed (Step S106). FIG. 5 is a schematic diagram for explaining the drawing process in the first embodiment. FIG. 5 illustrates an example of an optical fiber manufacturing apparatus 10 that draws the multicore fiber preform 1 and manufactures a target multicore fiber 15.

At Step S106, as illustrated in FIG. 5, the multicore fiber preform 1 is set in a drawing furnace 11 of the optical fiber manufacturing apparatus 10, one end portion of the set multicore fiber preform 1 is heated and melted by a heater 11a in the drawing furnace 11, and a glass optical fiber 12 is drawn downward in a vertical direction from the one end portion of the multicore fiber preform 1. Thereafter, a coating apparatus 13 applies ultraviolet curable resin to an outer peripheral surface of the glass optical fiber 12, and the applied ultraviolet curable resin is cured by application of ultraviolet light from an ultraviolet irradiation apparatus 14. As a result, the glass optical fiber 12 becomes the multicore fiber 15 whose outer peripheral surface is coated with the resin. Further, a guide roller 16 guides the multicore fiber 15 to a winding machine 17, and the winding machine 17 winds the multicore fiber 15 around a bobbin. In this manner, the multicore fiber 15 is manufactured.

Meanwhile, before the multicore fiber preform 1 is set in the optical fiber manufacturing apparatus 10, a tapered member with a welding portion having approximately the same outer diameter as the multicore fiber preform 1 may be welded to a drawing start end of the multicore fiber preform 1. With this configuration, it is possible to reduce a manufacturing loss at the start of drawing of the multicore fiber preform 1, and it is possible to use a large number of the assembled multicore fiber preforms 1 as product portions.

Configuration of Multicore Fiber

Figure 6:
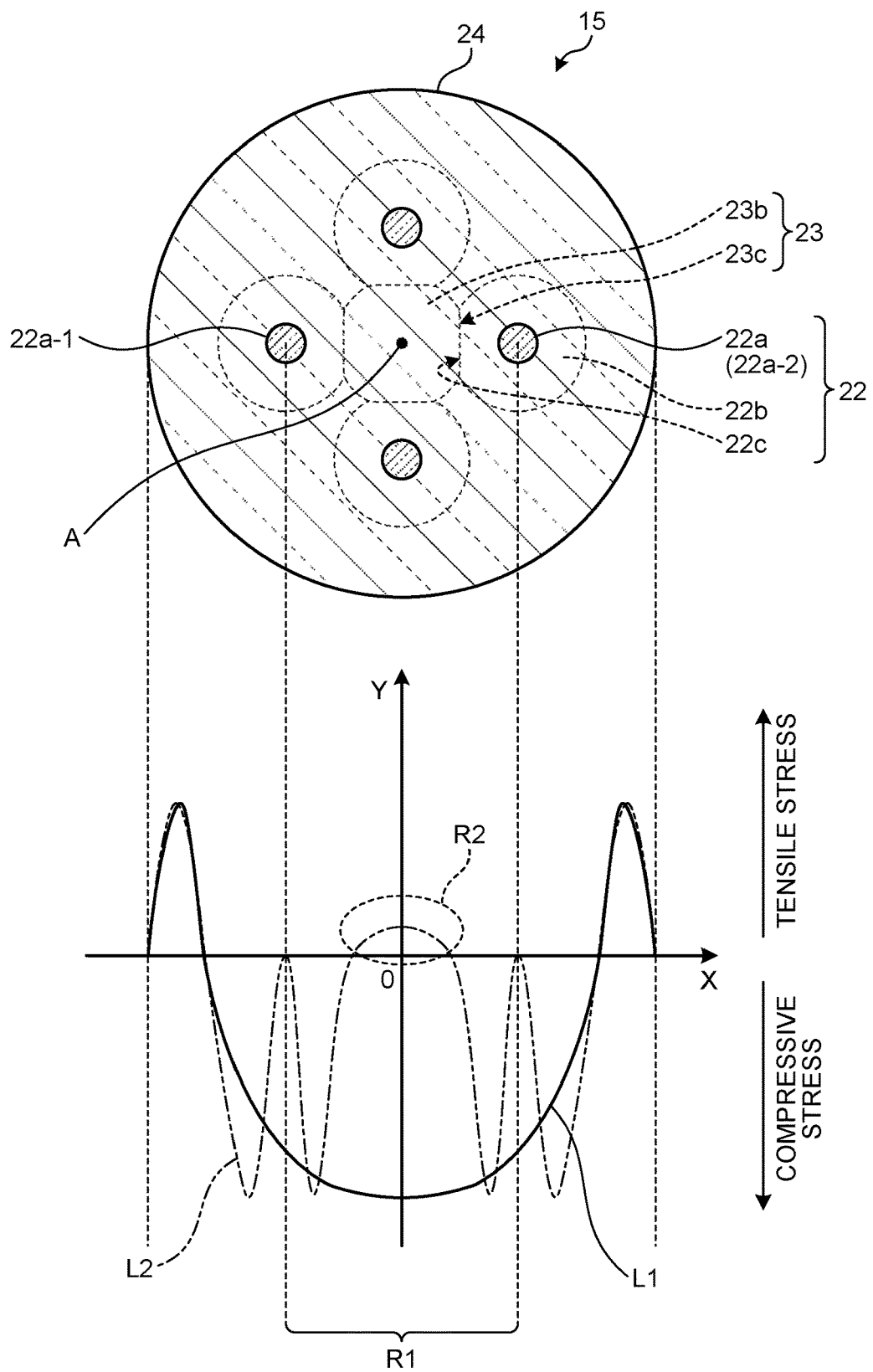
FIG. 6 is a transverse cross-sectional view illustrating a configuration example of the multicore fiber according to the first embodiment.

A configuration of the multicore fiber according to the first embodiment will be described below. FIG. 6 is a transverse cross-sectional view illustrating a configuration example of the multicore fiber according to the first embodiment. FIG. 6 illustrates a configuration of a transverse cross section of the multicore fiber 15 that is manufactured by using the multicore fiber preform 1 as described above (see FIG. 1). Further, FIG. 6 illustrates a stress distribution L1 that indicates a relationship between a position in a radial direction on the transverse cross section of the multicore fiber 15 and generated stress. In the XY coordinate system that represents the stress distribution L1, the X axis is a coordinate axis that represents the position in the radial direction of the multicore fiber 15. The Y axis is a coordinate axis that represents magnitude of each of tensile stress and compressive stress in the transverse cross section of the multicore fiber 15. Specifically, a positive value on the Y axis represents a value of the tensile stress, and a negative value on the Y axis represents a value of the compressive stress. The value of the tensile stress increases in the positive direction of the Y axis, and the value of the compressive stress increases in the negative direction of the Y axis. Furthermore, stress that changes in the positive direction of the Y axis is a component of the tensile stress, stress that changes in the negative direction of the Y axis is a component of the compressive stress.

Moreover, FIG. 6 illustrates a stress distribution L2 of a known multicore fiber that is manufactured from a multicore fiber preform obtained by the perforation method, as a stress distribution to be compared with the stress distribution L1 of the multicore fiber 15. The known multicore fiber is the same as the multicore fiber 15 according to the first embodiment except that the preform is manufactured by the perforation method.

As illustrated in FIG. 6, the multicore fiber 15 according to the first embodiment includes a plurality of (for example, four) first glass regions 22, a second glass region 23, and a cladding region 24. The plurality of first glass regions 22 are glass regions that correspond to the plurality of first glass rods 2 in the multicore fiber preform 1 as described above. Compressive stress is applied to the plurality of first glass regions 22. The second glass region 23 is a glass region that corresponds to the second glass rod 3 in the multicore fiber preform 1 as described above. The cladding region 24 is a glass region that corresponds to the cladding 4 in the multicore fiber preform 1 as described above. Tensile stress is applied to the cladding region 24. Meanwhile, an outer periphery of the cladding region 24 is coated, although not specifically illustrated in the drawings. As the coating, coating that is generally used in an optical fiber is used.

Specifically, each of the first glass regions 22 includes, as illustrated in FIG. 6, a first core portion 22a and a first cladding portion 22b that has a lower refractive index than a maximum refractive index of the first core portion 22a. The first core portion 22a is a core portion that corresponds to the first core portion 2a of the first glass rod 2 in the multicore fiber preform 1 as described above (see FIG. 1), and is configured with the same silica based glass as the first core portion 2a, although dimensions are different from the first core portion 2a. The first cladding portion 22b is a cladding portion that corresponds to the first cladding portion 2b of the first glass rod 2 in the multicore fiber preform 1 as described above, and, as illustrated in FIG. 6, the first cladding portion 22b is formed on an outer periphery of the first core portion 22a. The first cladding portion 22b is configured with the same silica based glass as the first cladding portion 2b in the multicore fiber preform 1, although dimensions are different from the first cladding portion 2b. Furthermore, a contact surface 22c as a plane surface that comes into contact with a second cladding portion 23b of the second glass region 23 is formed in a part of the outer periphery of the first cladding portion 22b.

The second glass region 23 includes, as illustrated in FIG. 6, the second cladding portion 23b that corresponds to the second cladding portion 3b of the second glass rod 3 in the multicore fiber preform 1 as described above, and is surrounded by the plurality of (four in the first embodiment) first glass regions 22. Specifically, as illustrated in FIG. 6, the second cladding portion 23b comes into contact with each of the first cladding portions 22b of the plurality of first glass regions 22. A contact surface 23c as a plane surface that comes into contact with the first cladding portions 22b is formed in each of portions facing the plurality of first glass regions 22 on an outer periphery of the second cladding portion 23b. In other words, the contact surfaces 22c of the first cladding portion 22b and the contact surface 23c of the second cladding portion 23b are plane surfaces that come into contact with each other.

Furthermore, the second cladding portion 23b is configured with the same silica based glass as the second cladding portion 3b in the multicore fiber preform 1, although dimensions are different from the second cladding portion 3b. For example, the second cladding portion 23b may be configured with the same silica based glass as the first cladding portion 22b of the first glass region 22, but it is preferable to include low softening point glass that has a lower softening point than the first cladding portion 22b. Moreover, it is more preferable that the second cladding portion 23b is configured with low softening point glass. The low softening point glass is the same as used for the second cladding portion 3b of the multicore fiber preform 1 as described above.

The cladding region 24 is formed on the outer peripheries of the plurality of first glass regions 22 and the second glass region 23 as illustrated in FIG. 6. The cladding region 24 corresponds to the cladding 4 in the multicore fiber preform 1 as described above, and is configured with the same silica based glass as the cladding 4, although dimensions are different from the cladding 4. For example, the cladding region 24 is configured with the same silica based glass as the first cladding portions 22b as described above. Meanwhile, the refractive indices of the first cladding portions 22b, the second cladding portion 23b, and the cladding region 24 as described above may be the same with each other or may be different from each other.

Furthermore, in the first embodiment, as illustrated in FIG. 6 for example, the plurality of first core portions 22a are arranged so as to face each other across a central axis A of the second cladding portion 23b of the second glass region 23. In this case, a distance between a central axis of each of the plurality of first core portions 22a and the central axis A of the second cladding portion 23b may be set to the same value or a different value. Moreover, the central axis A of the second cladding portion 23b may match with a central axis of the cladding region 24 or may be deviated from the central axis. Meanwhile, the central axis A of the second cladding portion 23b is the same as the central axis of the second glass rod 3 in the multicore fiber preform 1 as described above.

In the multicore fiber 15 configured as described above, as illustrated in FIG. 6 for example, the stress distribution L1 is generated along a radial direction (X-axis direction). The stress distribution L1 of the multicore fiber 15 includes tensile stress and compressive stress that are generated in the first core portions 22a, the first cladding portions 22b, the second cladding portion 23b, and the cladding region 24. In the stress distribution L1, stress at a position at which a component of the tensile stress is larger than a component of the compressive stress serves as the tensile stress, and stress in a portion in which the component of the tensile stress is smaller than the component of the compressive stress serves as the compressive stress. Specifically, as indicated by the stress distribution L1 in FIG. 6, the tensile stress is generated in the cladding region 24, and the compressive stress is generated in the plurality of first glass regions 22 and the second glass region 23.

Furthermore, in each of the first glass regions 22, stress is applied to the first core portion 22a from the first cladding portion 22b. The stress that is applied from the first cladding portion 22b to the first core portion 22a includes the component of the tensile stress that is applied from the first core portion 22a side to the first cladding portion 22b side.

Here, if the multicore fiber 15 is manufactured from a multicore fiber preform that is obtained by the perforation method, as indicated by the stress distribution L2 in FIG. 6, the stress in the first core portions 22a increases toward the tensile stress side (in the positive direction of the Y axis). In other words, an excessively large component of the tensile stress is applied to the first core portion 22a from the surrounding cladding portion.

In contrast, in the multicore fiber 15 according to the first embodiment, the plurality of first glass regions 22 and the second glass region 23 are configured such that each of the first cladding portions 22b to which large tensile stress is applied comes into contact with the second cladding portion 23b. With this configuration, it is possible to reduce concentration of the stress on the first core portion 22a, and it is possible to reduce the component of the tensile stress that is applied from the first cladding portion 22b to the first core portion 22a. As a result, the compressive stress is applied to each of the first glass regions 22, so that a magnitude relationship between the component of the tensile stress and the component of the compressive stress is not reversed. Furthermore, in the multicore fiber 15 according to the first embodiment, it is preferable that the second cladding portion 23b of the second glass region 23 includes low softening point glass, from the viewpoint of reducing the component of the tensile stress that is applied to the first core portions 22a.

Moreover, if the multicore fiber 15 is manufactured from a multicore fiber preform that is obtained by the perforation method, as indicated by the stress distribution L2 in FIG. 6, the tensile stress and the compressive stress are reversed in a region R1 between first core portions 22a-1 and 22a-2 that face each other in the radial direction of the multicore fiber 15 (see a region R2 in FIG. 6). In contrast, in the multicore fiber 15 according to the first embodiment, as indicated by the stress distribution L1 in FIG. 6, the tensile stress and the compressive stress are not reversed in the stress distribution that is generated between the first core portions 22a-1 and 22a-2 of the plurality of first glass regions 22 that face each other across the second glass region 23. The stress distribution as described above is generated in the region R1 between the first core portions 22a-1 and 22a-2 as described above in the entire stress distribution L1 of the multicore fiber 15.

Figure 7:
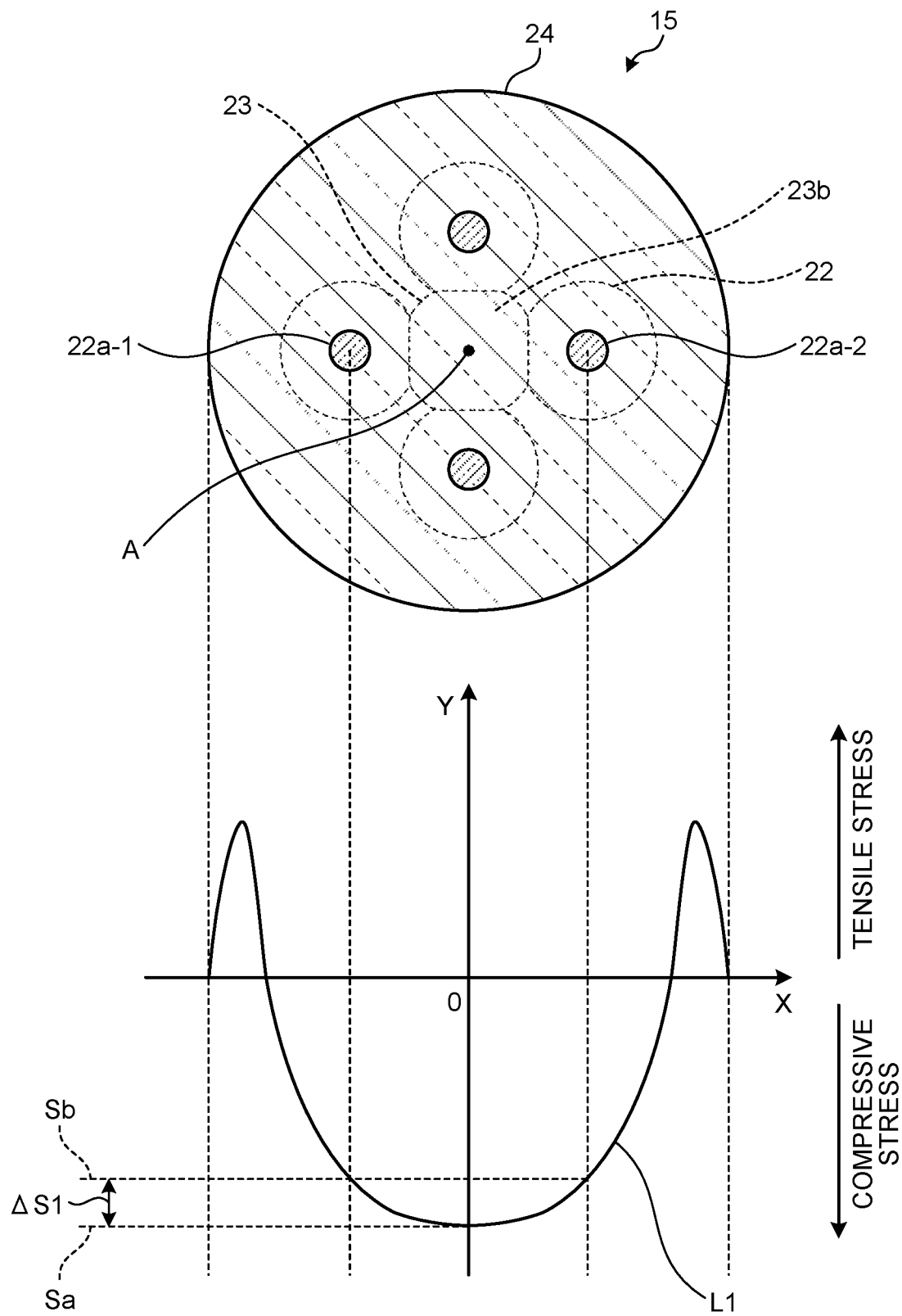
FIG. 7 is a diagram for explaining a difference between a maximum value and a minimum value in a stress distribution of the multicore fiber according to the first embodiment.

FIG. 7 is a diagram for explaining a difference between a maximum value and a minimum value in the stress distribution of the multicore fiber according to the first embodiment. As illustrated in FIG. 7, in the multicore fiber 15 according to the first embodiment, an average value of the compressive stress in the first glass regions 22 is smaller than an average value of the compressive stress in the second glass region 23 in the stress distribution that is generated in the region R1 (see FIG. 6) as described above in the entire stress distribution L1. Furthermore, it is preferable that a difference ΔS1 between the maximum value and the minimum value of the stress in the stress distribution is equal to or smaller than 30 MPa. It is more preferable that the difference ΔS1 is equal to or smaller than 20 MPa. Moreover, it is preferable that the maximum value of the stress is equal to or smaller than 80 MPa.

In the first embodiment, the stress distribution as described above is a stress distribution that is generated between the first core portions 22a-1 and 22a-2 of the plurality of first glass regions 22 that face each other across the second glass region 23. Furthermore, the maximum value in the stress distribution as described above is a maximum value Sa of the compressive stress, and the minimum value in the stress distribution as described above is a minimum value Sb of the compressive stress (see FIG. 7).

Figure 8:
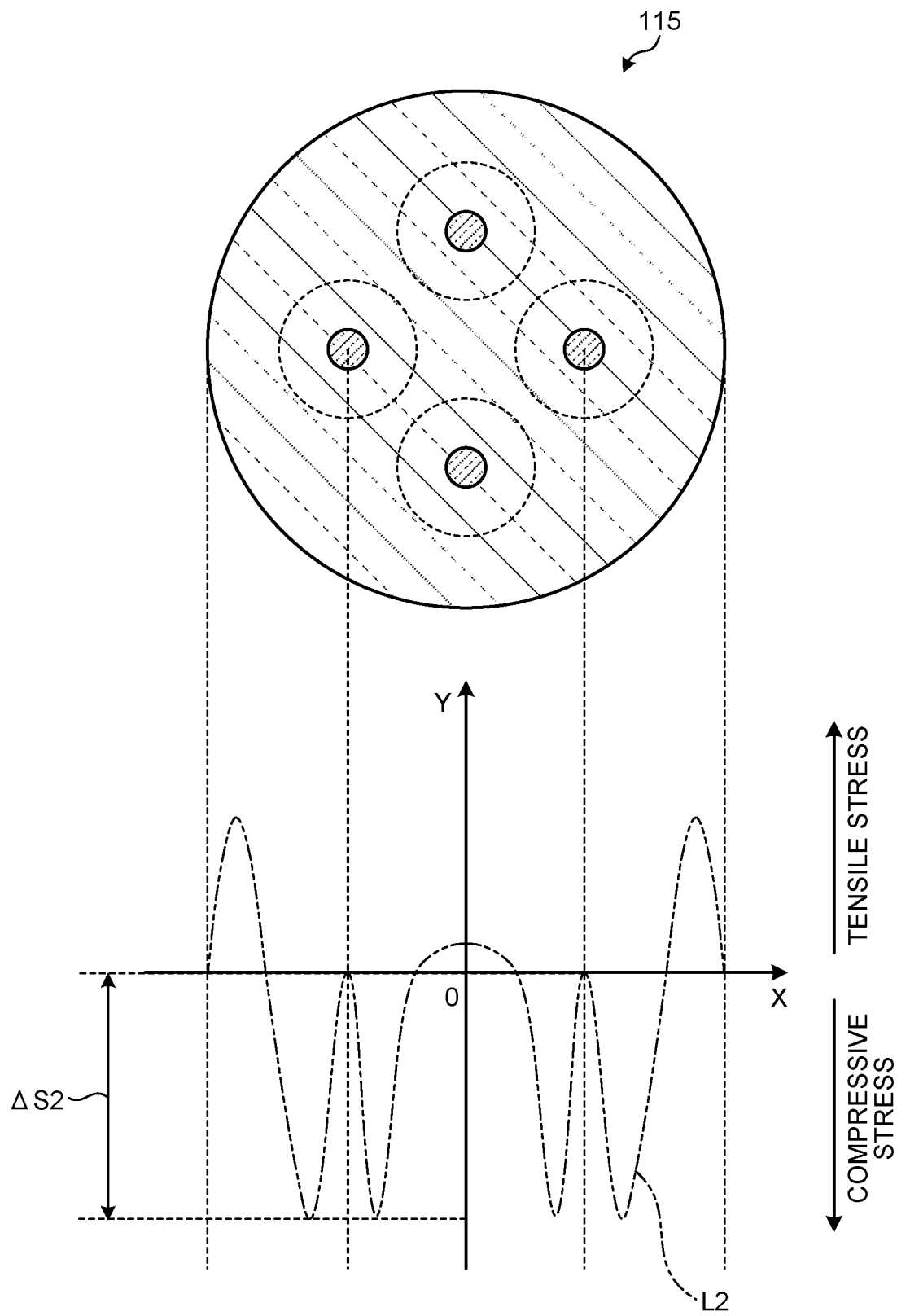
FIG. 8 is a diagram for explaining a difference between a maximum value and a minimum value in a stress distribution of a known multicore fiber that is manufactured from a multicore fiber preform obtained by a perforation process.

FIG. 8 is a diagram for explaining a difference between a maximum value and a minimum value in a stress distribution of a known multicore fiber that is manufactured from a multicore fiber preform obtained by the perforation method. As illustrated in FIG. 8, in a known multicore fiber 115, a difference ΔS2 between the maximum value and the minimum value of the stress in the stress distribution that is generated in the same region R1 as the multicore fiber 15 according to the first embodiment in the entire stress distribution L2 is larger than 30 MPa. In other words, in the known multicore fiber 115, it is difficult to reduce the stress that is concentrated on the core portions, as compared to the multicore fiber 15 according to the first embodiment as described above.

First Example

An example will be described below. In the present example, a sample of the multicore fiber 15 (hereinafter, referred to as an example sample) was manufactured by using the optical fiber manufacturing apparatus 10 illustrated in FIG. 5 and drawing the multicore fiber preform 1 according to the first embodiment. A configuration and optical characteristics of the manufactured example sample are described below.

Specifically, in the example sample, the first core portion 22a was formed in a single-peaked core shape, and a relative refractive-index difference Δ of the first core portion 22a with respect to the first cladding portion 22b was set to 0.35%. A core diameter of the first core portion 22a was set to 8.1 micrometers (μm), and a diameter (cladding diameter) of the cladding region 24 was set to 125.0 μm. The number of the first core portions 22a arranged (the number of cores) was set to four, and an interval (core pitch) between the first core portions 22a was set to 40.1 μm. Furthermore, a cutoff wavelength was set to 1267 nanometers (nm), and a mode field diameter (MFD) at the wavelength of 1550 nm was set to 10.6 μm.

Moreover, as a comparative example of the present example, a sample of a multicore fiber (hereinafter, referred to as a comparative example sample) was manufactured from a multicore fiber preform obtained by the perforation method. The comparative example sample was the same as the example sample as described above except that the multicore fiber preform obtained by the perforation method was used.

A light propagation loss was evaluated with respect to the example sample and the comparative example sample that were manufactured as described above. Configurations, optical characteristics, and evaluation results of the propagation loss of the example sample and the comparative example sample are listed in Table 1.

TABLE 1

| | Example Sample | Comparative Example Sample |
|---|---|---|
| Core Shape | Single-peaked | Single-peaked |
| Relative refractive-index difference Δ | 0.35% | 0.35% |
| Core Diameter | 8.1 μm | 8.1 μm |
| Cladding Diameter | 125.0 μm | 124.9 μm |
| Number of cores | 4 | 4 |
| Core Pitch | 40.1 μm | 39.8 μm |
| Cutoff Wavelength | 1258 nm | 1267 nm |
| MFD | 10.6 μm | 10.6 μm |
| Propagation Loss | 0.190 dB/km | 0.205 dB/km |

As indicated by Table 1, the propagation loss of the example sample was 0.190 dB/km. A value of the propagation loss is approximately the same level as a single-core optical fiber that includes a single core portion that is the same as the example sample. In other words, in the example sample, it is possible to suppress the light propagation loss at approximately the same level of propagation loss as the single-core optical fiber. In contrast, the propagation loss of the comparative example sample was 0.205 dB/km. From the evaluation results as described above, it is confirmed that, in the comparative example sample, the light propagation loss increases as compared to the example sample and it is difficult to prevent an increase in the propagation loss.

Thus, as described above, in the first embodiment, a multicore fiber is configured to include a plurality of first glass regions each including a first core portion and a first cladding portion that has a lower refractive index than a maximum refractive index of the first core portion, a second glass region that includes a second cladding portion that comes into contact with each of the first cladding portions of the plurality of first glass regions, and is surrounded by the plurality of first glass regions, and a cladding region that is formed on outer peripheries of the plurality of first glass regions and the second glass region. Furthermore, in the multicore fiber, in a stress distribution that is generated between the first core portions of the plurality of first glass regions that face each other across the second glass region, an average value of compressive stress in the first glass regions is smaller than an average value of compressive stress in the second glass region. In this case, a difference between a maximum value and a minimum value of stress in the stress distribution is set to 30 MPa or less, for example.

With this configuration, it is possible to reduce concentration of the stress applied to each of the first core portions, and reduce a component of tensile stress that is applied from the first cladding portion side to the first core portions. Therefore, it is possible to prevent an increase in a transmission loss of the multicore fiber, so that it is possible to realize a multicore fiber that is able to reduce a light propagation loss to approximately the same level of propagation loss as a single-core optical fiber.

Furthermore, in the first embodiment of the present embodiment, the second cladding portion is configured to include low softening point glass that has a lower softening point than the first cladding portion. With this configuration, it is possible to easily reduce the concentration of the stress on each of the first core portions, and further reduce the component of the tensile stress that is applied from the first cladding portion side to the first core portions. Consequently, it is possible to further prevent an increase in the transmission loss of the multicore fiber, so that it is possible to easily realize a multicore fiber that is able to reduce a light propagation loss to approximately the same level of propagation loss as a single-core optical fiber.

Second Embodiment

Figure 9:
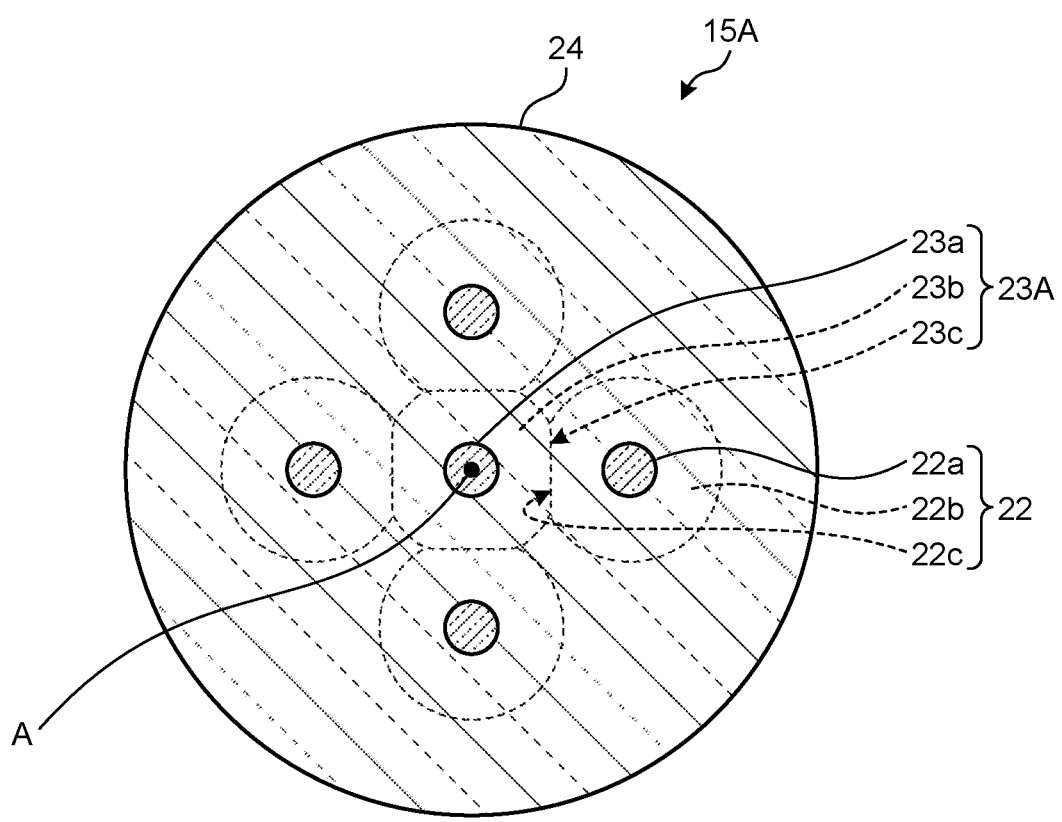
FIG. 9 is a transverse cross-sectional view illustrating a configuration example of a multicore fiber according to a second embodiment.

A second embodiment will be described below. FIG. 9 is a transverse cross-sectional view illustrating a configuration example of a multicore fiber according to the second embodiment. As illustrated in FIG. 9, a multicore fiber 15A according to the second embodiment includes a second glass region 23A instead of the second glass region 23 of the multicore fiber 15 according to the first embodiment (see FIG. 6) as described above. The other configurations are the same as the first embodiment, and the same components are denoted by the same reference symbols.

The second glass region 23A includes, as illustrated in FIG. 9, the same second cladding portion 23b as the first embodiment as described above, and a second core portion 23a that has a higher maximum refractive index than a refractive index of the second cladding portion 23b. Further, the second glass region 23A is surrounded by the plurality of (for example, four) first glass regions 22, similarly to the first embodiment as described above.

The second core portion 23a is configured with, for example, silica based glass that is doped with a dopant (germanium or the like) to increase a refractive index. As illustrated in FIG. 9, the second core portion 23a is arranged at the same position as the central axis A of the second cladding portion 23b in the second glass region 23A. Meanwhile, the refractive index of the second core portion 23a may be the same as or different from the refractive indices of the first core portions 22a in the plurality of first glass regions 22. Furthermore, the central axis of the second core portion 23a may match with or may be deviated from the central axis A of the second cladding portion 23b.

The multicore fiber preform according to the second embodiment includes, although not specifically illustrated in the drawings, a core portion that serves as the second core portion 23a as described above in the second glass rod 3 of the multicore fiber preform 1 according to the first embodiment as described above (see FIG. 1), and has the same configuration as the first embodiment except for the core portion. Furthermore, the multicore fiber 15A is manufactured from a multicore fiber preform of the second embodiment by using the optical fiber manufacturing apparatus 10 (FIG. 5), similarly to the case in the first embodiment as described above.

Thus, as described above, in the second embodiment, the second glass region in the multicore fiber includes the second core portion that has a higher maximum refractive index than a refractive index of the second cladding portion, and the other components are configured in the same manner as the first embodiment. Therefore, in the multicore fiber that includes the second core portion in an inner region that is surrounded by the plurality of first core portions, it is possible to achieve the same operation and effects as those of the first embodiment as described above.

Meanwhile, in the first and the second embodiments as described above, the examples have been described in which the multicore fiber includes the four first glass regions each including the first core portion and the first cladding portion, but the present disclosure is not limited to this example. In the multicore fiber according to the present disclosure, the number of the first glass regions to be arranged (the numbers of the first core portions and the first cladding portions to be arranged) may be two or more.

Furthermore, in the second embodiment as described above, the example has been described in which the single core portion (the second core portion 23a) is arranged in the second glass region that is surrounded by the plurality of first glass regions, but the present disclosure is not limited to this example. In the multicore fiber according to the present disclosure, when the core portion is arranged in the second glass region, the number of the core portions to be arranged may be singular or plural.

Moreover, in the first and the second embodiments as described above, the core portions (the first core portions and the second core portion) are configured with silica based glass that is doped with a dopant, such as germanium, and the cladding portions (the first cladding portions, the second cladding portion, and the cladding region) are configured with pure quartz glass, but the present disclosure is not limited to this example. For example, the core portions as described above may be configured with pure quartz glass, and the cladding portions as described above may be configured with silica based glass that is doped with a dopant (for example, fluorine) to decrease a refractive index.

Furthermore, in the first and the second embodiments as described above, the holes for inserting the glass rods are formed in the cylindrical cladding that constitutes the multicore fiber preform by the non-open-cut method, but the present disclosure is not limited to this example. For example, it may be possible to manufacture a multicore fiber preform by a stacking method in which a plurality of glass rods are arranged inside a glass tube that includes circular holes. Alternatively, it may be possible to prepare a cladding in which holes are formed by a powder molding method or the like, and manufacture a multicore fiber preform by inserting a plurality of glass rods in the holes of the cladding.

Moreover, in the first and the second embodiments as described above, the plurality of first cladding portions and the second cladding portion that is surrounded by the plurality of first cladding portions come into surface contact with each other, but the present disclosure is not limited to this example. For example, the plurality of first cladding portions and the second cladding portion as described above may come into line contact with each other.

Furthermore, the present disclosure is not limited by the first and the second embodiments as described above, and the present disclosure includes a configuration in which the components as described above are appropriately combined. In addition, the present disclosure includes all of other embodiments, examples, operational techniques, and the like that are made by a person skilled in the art based on the first and the second embodiments as described above.

According to the present disclosure, it is possible to realize a multicore fiber in which an increase in the transmission loss is prevented.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multicore fiber comprising:
   a plurality of first glass regions each including: a first core portion; and a first cladding portion having a lower refractive index than a maximum refractive index of the first core portion;
   a second glass region including a second cladding portion surrounded by the plurality of first glass regions, the second cladding portion coming into contact with the first cladding portions of the plurality of first glass regions; and
   a cladding region formed on outer peripheries of the plurality of first glass regions and the second glass region, wherein
   in a stress distribution generated between the first core portions of the plurality of first glass regions that face each other across the second glass region, an average value of compressive stress in the first glass regions is smaller than an average value of compressive stress in the second glass region.

2. The multicore fiber according to claim 1, wherein a difference between a maximum value and a minimum value of stress in the stress distribution is equal to or smaller than 30 MPa.

3. The multicore fiber according to claim 1, wherein the second glass region includes a second core portion having a higher maximum refractive index than a refractive index of the second cladding portion.

4. The multicore fiber according to claim 1, wherein the second cladding portion includes low softening point glass having a lower softening point than the first cladding portion.

5. The multicore fiber according to claim 1, wherein stress that is applied from the first cladding portions to the first core portions includes a component of tensile stress.

6. The multicore fiber according to claim 1, wherein tensile stress and comparative stress are not reversed in the stress distribution.

7. The multicore fiber according to claim 1, wherein a maximum value of stress in the stress distribution is equal to or smaller than 80 MPa.

* * * * *